United States Patent Office 3,335,201
Patented Aug. 8, 1967

3,335,201
AMINO-FUNCTIONAL PHENOL CONTAINING POLYSULFIDE POLYMERS AND THEIR REACTION PRODUCTS WITH POLYEPOXIDES
Eugene R. Bertozzi, Yardley, Pa., assignor to Thiokol Chemical Corporation, Bristol, Pa., a corporation of Delaware
No Drawing. Filed Sept. 9, 1964, Ser. No. 395,305
10 Claims. (Cl. 260—831)

The present invention relates to a novel class of liquid amino-functional phenol containing polysulfide polymers, and to the novel resinous reaction products of amino-functional phenol containing polysulfide polymers with polyepoxides, and further to the processes for their production.

Mercaptan-terminated polysulfide liquid polymers, such as may be symbolized by the formula $$H(SRS)_x(SR'(SH)_nS)_yH$$

where $x$ varies from 2 to 10, $y$ varies from 0 to 10, and $n$ varies from 0 to 2 and made in accordance with the teachings of U.S. Patent 2,466,936 to Patrick et al., dated Apr. 12, 1949, were revealed to form valuable resinous products with polyepoxides by Fettes and Gannon, in their U.S. Patent 2,789,958. Other valuable resinous products of the reaction of hydroxy-terminated polysulfide polymers and polyepoxides were also revealed in U.S. Patent 2,789,958. Such hydroxycontaining polysulfide polymers may be produced in accordance with the teachings of Fettes in his U.S. Patent 2,606,173. Fettes and Gannon also teach the use of aliphatic amines as catalysts to promote the formation of these valuable resinous products.

Indeed it has been found that use of amines is needed to provide practical rates of reaction between the aforesaid polysulfide polymers and polyepoxides. Many of the useful separate catalysts for such reactions are quite toxic, and among others include such compounds as tri(dimethylaminomethyl)phenol, diethylenetriamine, dimethylaminomethyl phenol, triethylenetetramine, dimethylaminopropylamine, diethylaminopropylamine, benzyldimethylamine, piperidine, diethylamine, dimethylaminopropionitrile, 2-ethyl hexoic acid salt of tri(dimethylaminomethyl)phenol, and m-phenylenediamine. Where no separate amine catalyst is used the reactants, according to prior art practice, must endure unduly long cure intervals, and even where very low molecular weight polysulfide reactants and elevated cured temperatures are employed. Further, in the instance where a separate amine catalyst is used the practitioner suffers the inconveniences, disadvantages, and dangers inherent in weighing out and compounding into the polysulfide-polyepoxide mixtures relatively small quantities of highly active catalytic materials. These events invite high relative error in the compounding process, and thus a high degree of uncertainty in the reproducibility of the cured resinous products obtained. Another disadvantage presents itself due to dermatological irritations provided by many of these separate amine catalysts. To avoid these inconveniences and dangers, unusual caution must be provided in the compounding of the reactant and catalysts; these precautions increase substantially the time and cost of providing cure resinous products. Another economic disadvantage in the use of separate amine catalysts involves the necessary use of a separate blending operation in which a small amount of amine must be uniformly dispersed into a relatively large volume of polysulfide-polyepoxide reactions. This procedure enhances the probability of providing nonuniformly cured resinous compositions due to a non-homogeneous blending of the separate catalyst throughout the reaction mixture. Non-uniformity of cure invites impairment of the gross physical properties of the cured resinous products, as well as a reduced ability to reproduce from batch to batch cured resinous products of similar physical properties. Still other disadvantages flow from the use of separate amine catalysts in the prior art compositions. Some amine catalysts, for example, are either insoluble in or are only partially soluble in the liquid polysulfide-polyepoxide reactants; this imparts substantial difficulties to the uniform dispersion of catalysts in reactants. Some amine catalysts will cause reversion of the solid cured resinous products, after their cure and upon aging and/or heat treatment, to provide an undesirable deterioration with time in the physical properties of the cured resinous products. It is to the remedy of these and other difficulties that the present invention is directed.

The present invention concerns the preparation and use of amino-functional phenol containing polysulfide polymers, and especially their reaction with polyepoxides at economical cure rates without separate amine catalysts to provide useful resinous products with enhanced properties of flexibility, stability, and utility. Fettes in his U.S. Patent 2,606,173, has revealed a method for the preparation of certain types of amino-functional polysulfide liquid polymers. Fettes presents a series of equations numbered (1) to (7), depicting the preparation of this class of amino-functional polysulfide liquid polymers, and wherein mercaptan-functional polysulfide liquid polymers are reacted with amino-mercaptans in the presence of oxygen, or oxygen contributing substances, in reversible reactions to form amino-functional polysulfide liquid polymers and water.

The Fettes and Gannon compositions and their method for providing certain amino-functional polysulfide liquid polymers suffer from several substantial disadvantages. Among these may be included (a) the necessary removal of water from the polysulfide product to prevent reversion of the product to the amino-mercaptan and mercaptan-functional polysulfide polymer reactants. The presence of water produced in the present process has no deleterious effect on the stability of the present amino-functional phenol containing polysulfide polymers. Another substantial disadvantage inherent to the Fettes and Gannon method is that it requires (b) extreme care in exactly prescribing the amount of amino-mercaptan reactant employed. Even small excesses of such mercaptan will cause substantial, excessive, multiple, and unequal scissions of the polysulfide polymer reactant and split the polymer into small unequal fragments, even to forming some monomer, viz. U.S. 2,606,173, bridging paragraph columns 4 and 5. The Fettes and Gannon process (c) makes it necessary to use only mercaptan terminated polysulfide reactants, thus limiting the choice of reactants. Further (d) the random nature of scission at disulfide linkages of the polysulfide makes it very difficult to obtain an amino-polysulfide liquid product with a prescribable and narrowly distributed range of molecular weights as is demanded by the present state of the art to provide resinous cure products with reproducible and prescribe physical properties. Thus, although the Fettes and Gannon amino-functional polysulfide polymers may be used with polyepoxides to provide resinous products, they do not provide the versatility and uniformity that are provided the amino-functional phenol containing polysulfide polymers of the present invention.

It is an object of this invention to provide novel amino-functional phenol containing polysulfide liquid polymers which will provide novel resinous cure products of enhanced flexibility, stability, and utility upon reaction with polyepoxides.

It is another object of this invention to provide a novel class of amino-functional phenol containing polysulfide liquid polymers by reaction of chalcogen-hydric terminated polysulfide liquid polymers with a phenol, formaldehyde, and a polyamine, and a process therefor.

Another object of this invention is to provide novel resinous reaction products of amino-functional phenol containing polysulfide liquid polymers and polyepoxides which have enhanced properties of flexibility, stability, and utility, and a process therefor.

Other objects of this invention are apparent from or are inherent in the following explanations and example.

It has been unexpectedly discovered that the foregoing objects are attained through the novel compositions and processes of this invention. In particular, it has been unexpectedly found that if amino-functional phenol containing polysulfide liquid polymers are formed by the reaction of a phenol, formaldehyde, and a poly-primary amine with liquid chalcogen-hydric terminated polysulfide liquid polymers, e.g. OH or SH terminated polysulfide polymers, the latter being prepared according to the teachings of U.S. 2,606,173 and U.S. 2,466,963, respectively, that they may be reacted with polyepoxides to provide novel solid resinous cure products with enhanced properties of flexibility, stability, and utility.

The amino-functional polysulfide polymers of this invention may be described as that class of compositions having molecular structures depicted by the formula

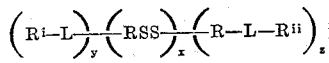

wherein $R^i$ and $R^{ii}$ are as follows:

the phenol-amino groups

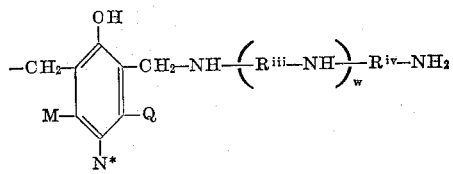

and /or

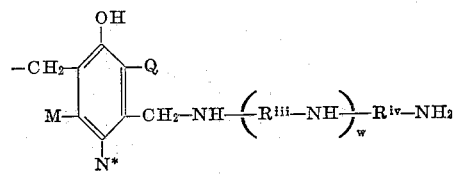

wherein M, N*, and Q may be hydrogen, lower alkyl, and lower alkylether or thioether groups, $w$ is an integer that is one of 0, 1, 2, 3, 4, 5, and 6, $y$ and $z$ being one of 1, 2, 3 and 4, $R^{iii}$ and $R^{iv}$ are the same or different and are radicals chosen from the group consisting of normal and branched alkyl radicals, alkyl ether or thioether radicals, and substituted and unsubstituted aromatic and alicyclic radicals, $x$ is a positive number greater than 1 and R is an intervening polyvalent organic radical. Examples of such polyvalent radicals are those listed below in Tables I and II.

TABLE I
(Radicals having a free valence of 2)

—(CH$_2$)$_n$—(n=1 to 10)
CH$_3$CHCHCH$_3$
    |  |
CH$_3$CHCH$_2$
    |  |
C$_2$H$_5$CHCH$_2$CHC$_2$H$_5$
    |         |
—CH$_2$CHCH$_2$—
    |
  CH$_3$

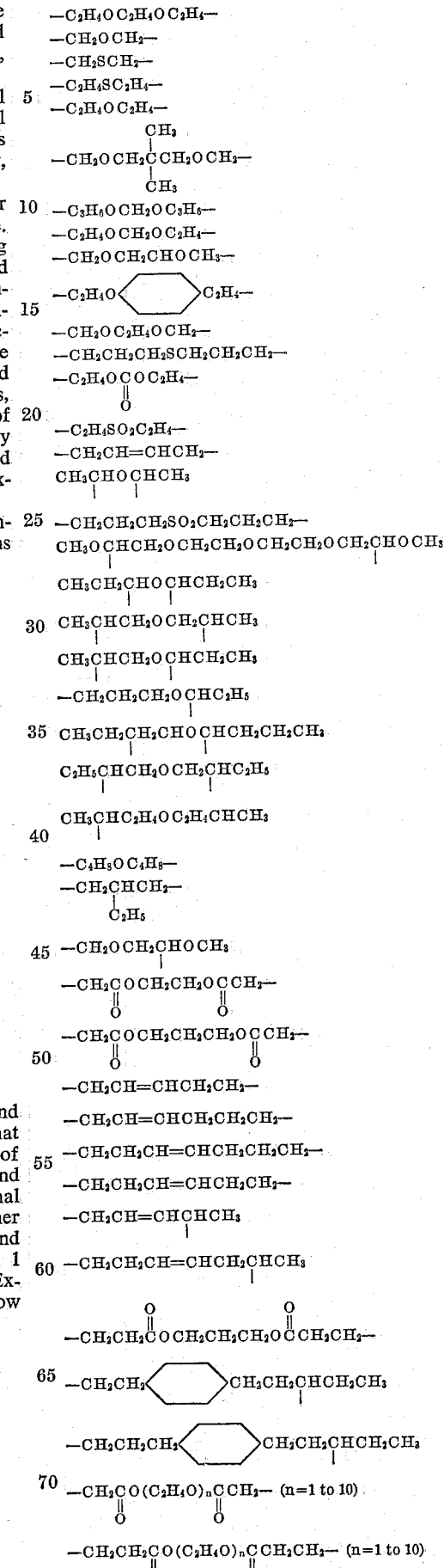

TABLE II
(Radicals having a free valence of 3 and 4)

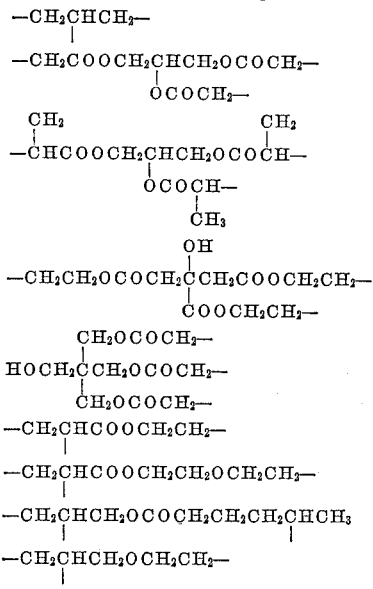

—CH₂CHCH₂OCH₂OCH₂CH₂—
  |
  CH₂—

—CH₂CCH₂—
  |
  CH₂—

—CH₂CHCH₂OCH₂OCH₂CHCH₂—
  |                        |

—CH₂CHCH₂OCH₂OCH₂CHCH₂—
              CH₂OCOCH₂—
              |

—CH₂COOCH₂CCH₂OCOCH₂—
           |
           CH₂OCOCH₂—

—CH₂CHCH₂OCOCH₂CH₂CH₂CH₂COOCH₂CHCH₂—
  |                                   |

—CH₂CHCH₂SCH₂CHCH₂—
  |              |

—CH₂CHCOOCH₂CH₂OCOCHCH₂—
  |                    |
           CH₃
           |
           CHOCOCH—
—CHCOOCH₂CCH₂OCOCH—
  |         |      |
  CH₃       |      CH₃
           CHOCOCH—
           |
           CH₃

—CH₂CHCOOCH₂CHCH₂—
  |              |

—C₂H₄OCH₂OCH₂CH(OCH₂OC₂H₄—)CH₂OCH₂OC₂H₄—

The most useful amino-functional phenol containing polysulfide polymers of this invention are those which are normally liquid at 25° C. and have a molecular weight of at least 400, and in the range of 400 to 10,000. The preferred polymers are those wherein $y$ and $z$ are 1, $x$ is 2 to 10, —L— is —S—, R is an ethylene or a diethylene gem diether radical, and $R^i$ and $R^{ii}$ are the same and are

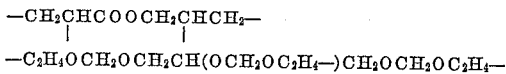

and/or

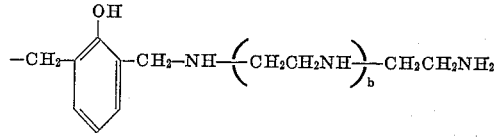

wherein $b$ is 1 or 2.

The novel process by which the present class of amino-functional phenol containing polysulfide polymers may be prepared may be generally summarized as follows:

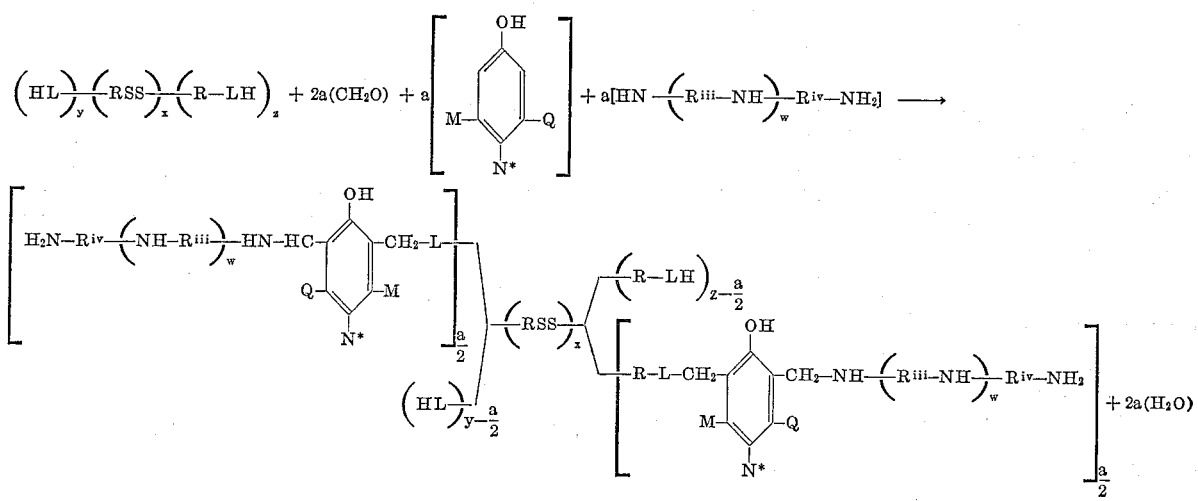

wherein —L— is —O—, or —S—, and $x$, R, $R^{iii}$, $R^{iv}$, and $y$ and $z$ are as previously defined, —LH is a chalcogen-hydric radical, and $a$ is a number $\leq (y+z)$.

To form the present amino-functional phenol containing polymers, —SH, and/or —OH functional polysulfide liquid polymers are mixed and heated in the presence of formaldehyde, phenol and a poly-primary amine, defined as above, in the ratio of at least one mole of diamine per equivalent weight of a chalcogen-hydric functional polysulfide, the latter equivalent being defined in conventional terms of mercaptan, and/or hydroxy functionality. Useful polymer products are obtained thereby wherein fact not every —LH grouping may be reacted, and where the polymer product may give evidence of the presence of both reactive amine and reactive —LH groupings. To provide faster curing polysulfides of this invention one may increase the ratio of equivalents of reactive amine to reactive —LH groupings present in the polymeric product. One method that may be used is to increase the charge ratio of equivalents-of-amine/equivalents-of-chalcogen-hydric radicals above 2:1; in certain instances ratios of 10:1 and even higher are usefully employed.

The present invention contemplates the use of mixtures of different poly-primary amines, such as occurs where the $R^{iii}$ and/or $R^{iv}$ radicals in the component polyamines are different, to form other novel amino-functional phenol containing polysulfide polymers of this invention, whereas some molecules of which have the same and some dissimilar terminals. At any one time therefore the amino-functional phenol containing polysulfide compositions of the present invention would contain molecules with active amine terminals which may be either the same or different, depending upon whether one or more than one poly-primary amine reactant was used in their formation, and in addition would contain some molecules with —LH terminals.

In the process to prepare the present alkyl amino-functional phenol containing polysulfide polymers elevated temperatures are used to facilitate the reaction.

Amino-functional phenol containing polysulfide polymers of this invention are liquids which have viscosities not dissimilar to those of the —LH terminated polysulfide reactants employed in their making; they exhibit toxicities that are substantially less than those exhibited by mixtures of —LH polysulfide polymers and the separate prior art catalysts often used to promote and enter into polysulfide-polyepoxide resin reactions; further, the physical and chemical characteristics of the present amino-functional phenol containing compositions provide for no greater handling problems than those of the —LH terminated polysulfide reactants used in their preparation. The process of the invention makes it apparent that the distribution of molecular weights of the present amino-functional polysulfide polymer products closely follows the distribution of molecular weights of the —LH terminated polysulfide reactants. No scission of polysulfide molecules occurs as it does in the Fettes and Gannon process. Further, water produced as a by-product has no deleterious effect on the polymers obtained as it does in the Fettes and Gannon process.

Polyepoxide materials react with the above described liquid amino-functional phenol containing polysulfide polymers to form desirable resinous products. The polyepoxides are preferably liquids which have an average epoxide functionality of approximately two epoxide groups per molecule of polyepoxide material. The position of epoxide groups in the polyepoxide material is not critical to the practice of this invention. For instance, if the polyepoxide material is essentially linear in structure epoxide groups may be in terminal positions or they may be positioned intermediately and/or randomly along the linear structure. Polyepoxide materials which may enter into cure with the above defined polysulfide polymers include the following types of materials:

(1) Essentially linear types such as

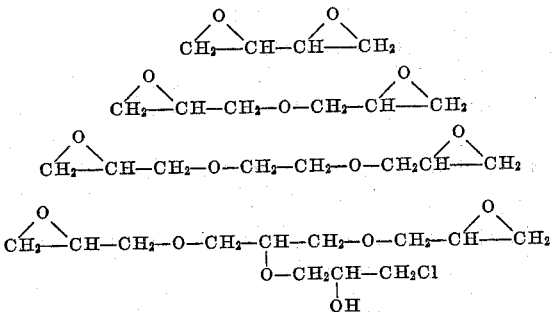

and epoxidized polybutadiene materials such as those which have an epoxide functionality of four or more and which are available under the designation Oxiron resins, i.e., Oxiron 2000, Oxiron 2001 and Oxiron 2002;

(2) Epichlorohydrin-bisphenol A types which are aromatic in nature and which include those available under the trademark designation Tipox, i.e., Tipox A, Tipox B, and Tipox C, those available under the designation Epon resins, i.e., Epon 828 and Epon 820, those available under the designation Bakelite ERL resins, and those available under the designation Epi-Rez, resins, i.e., Epi-Rez 510;

(3) Cyclo-aliphatic types which include those available under the designation Unox resins, i.e., Unox 206, which is epoxy ethyl-3,4-epoxy cyclohexane and Unox 201, which is 3,4-epoxy-6-methylcyclohexylmethyl-3,4-epoxy-6-methylcyclohexanecarboxylate;

(4) Resorcinol diglycidyl ether types which include those available under the designation Kopoxite resins, i.e., Kopoxite 159;

(5) Epoxy novalak type which includes the resins available under the designations Dow Epoxy Novalak 438 and Den 438–EK 85, and also those available under the designation Ker resins, i.e., Ker. 357A and Ker 955A;

(6) Epoxidized fatty acid resins including the Epoxol materials such as Epoxol 9–5; and others.

In certain instances some solid polyepoxide materials may be used, say where a finely distributed uniform dispersion with the instant liquid polysulfide polymers may be obtained, or where the solid polyepoxides are soluble either in the instant polysulfides or in a common cosolvent with the instant polysulfides. Useful polyepoxide materials according to the practice of this invention have epoxide equivalent weights of 100 to over 4000. Thus within the requirements here taught a practitioner in the art may choose from among a wide variety of polyepoxide materials as to specific epoxide equivalent values, specific molecular configuration, molecular weight and functionality to pursue practice of this invention for specific end uses.

The novel solid resinous cure products of this invention are obtained by reaction between the present amino-functional phenol containing polysulfide polymers and the above defined polyepoxide materials according to a simple process. They are mechanically admixed to form a uniform liquid blend or dispersion and then are permitted to cure within some given temperature range within from ambient temperatures to about 150° C. The reactants where liquid are usually completely compatible one with the other. Once blended together the polyepoxides and amino-functional phenol containing polysulfides, after an induction period known as the "pot life," and which is dependent upon the nature of the reactive components and the temperature, will perceptively cure to useful solid flexible resinous compositions. In some end uses, where desired, tacky or tack-free solid products may be obtained depending upon the quantities and types of reactants used. Cure rate is importantly dependent upon the chemical nature of the specific system of coreactants used, and the temperature of cure. In some instances at specific temperatures, solid resinous compositions are obtained within 15 minutes of blending, and other instances with other specific coreactants at these same specific temperatures it may require days to obtain the desired solid compositions. In general, faster rates of cure will be obtained where the ratio of amino/—LH equivalents in the polysulfide is increased, where the temperature of cure is increased, further where lower molecular weight coreactants are used, and even further where epoxide functionality of the polyepoxide chosen is increased.

The range of useful ratios of weight proportions of polyepoxides to that of the present amino-functional phenol containing polysulfide polymers suitable for cure in present practice extends from less than about 1:5 to more than about 5:1. It has been found however that the most useful resinous compositions are obtained where the ratios of weight proportions of polyepoxides to that of amino-functional phenol containing polysulfides fall within the range of 1:2 to that of 2:1.

The present range of useful cure temperatures extend from below common room temperatures, 20 to 25° C., to above 150° C.; this also offers wide choice to the practitioner to suit the requirements of specific end uses, pot life and cure times and thus imparts added utility to the present invention.

Amino-functional phenol containing polysulfide polymers produced according to the practice of this invention find use as flexibilizing agents in resinous products of reaction with polyepoxide materials and unexpectedly provide unusually desirable working properties with respect to both the liquid formulations prior to cure, and to the solid resinous products obtained after cure. Cured castings produced with the present reaction products unexpectedly possess unusual degrees of flexibility, far out of proportion to that which may be expected from prior art experience with castings formed as the reaction products of —LH terminated polysulfides and polyepoxides taught by U.S. 2,789,958. Separate catalysts are not needed to practice this invention. The present amino-functional phenol containing polysulfide polymers present further substantial advantage in that they will react, in general, far more rapidly with polyepoxide materials than will analagous prior art —LH terminated polysulfides in the absence of separate amine catalysts. Yet, further, the novel liquid polysulfide polymers of this invention may be compounded into cure systems with polyepoxide materials with far greater ease, in less time, with a greater degree of compatibility and homogeneity and with less danger from toxicity than may prior art systems employing separate amine catalysts. These substantial advantages and others are obtained through use of compositions of the present invention.

The following example is given to more fully explain the nature of the present invention, but is merely illustrative and does not seek to limit its scope as defined by the claims.

EXAMPLE

A. *Preparation of amino-functional phenol containing polysulfide polymer*

A 500 ml. three-necked round bottom flask fitted with stirrer, thermometer, and distillation condenser open to the atmosphere, was sequentially charged with (a) 120 g. (about 0.12 mol) of a di-mercaptan functional polysulfide liquid polymer of approximately 1000 molecular weight and predominantly composed of the repeating unit $$-(C_2H_4OCH_2OC_2H_4SS)-$$

and containing approximately 2% by weight of crosslinking units effected by trichloropropane, (b) 20 g. (about 0.213 mol) of phenol, (c) 14 g. (about 0.465 mol) of formaldehyde in the form of its trimer paraformaldehyde, and (d) 30 g. (about 0.204 mol) of triethylenetetramine, an amine having two primary and two secondary amine groups each separated by an ethylene linkage, $$-(C_2H_4)-$$

The reactants were heated with stirring at 100° C. for about 2 hours. The temperature of the reaction mixture was permitted to fall to ambient and remain there for two to three days. The reaction mixture was then heated to 100° C. under reduced pressure of about 100 mm. Hg, at which point about 3 ml. of water were distilled. The pot product remaining was an orange colored viscous liquid polymeric material with a faint phenolic and ammoniacal odor. Analysis of the polymeric product for weight percent nitrogen was determined to be about 5.7%, as compared to about 6.3% theoretical for an amino-functional phenol containing polymer of formula

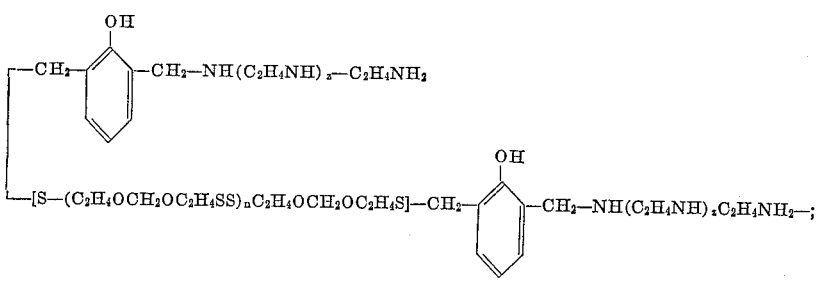

and of molecular weight of about 1,200 to 1,300.

B. *Resinous cure products with polyepoxide*

The cure properties and products of the liquid amino-functional phenol containing polysulfide polymer produced in A above, and hereinafter called Polymer A, and a liquid bisphenol - A - epichlorohydrin polyepoxide with epoxide equivalent of 180 to 200 and viscosity at 77° F. of 90 to 180 poises, and hereinafter called Epi-Rez 510 polyepoxide, were observed when they were admixed under the conditions and in the proportions listed in the following table.

| Experiment | A | B |
|---|---|---|
| Recipe, in parts by weight: | | |
| Polymer A | 100 | 100 |
| Epi-Rez 510 Polyepoxide | 200 | 100 |
| Properties at 80° F.: | | |
| Liquid Pot Life, minutes | 120 | 70 |
| Set or Gel Time, minutes | 130 | 75 |
| Tack-Free Time of Cured Product, hrs | 24 | 4 |
| Highest Temperature during Cure, ° F | 96 | 118 |
| Odor of Recipe | (¹) | (¹) |
| Cured Casting: | | |
| Color | Amber | Amber |
| Clarity | Clear | Clear |
| Hardness, Shore "D" Durometer Degrees at 80° F.: | | |
| After 72 hours | 22 | 56 |
| After 7 days | 53 | 67 |
| After 14 days | 86 | 76 |
| At 120° F.: | | |
| For 72 hours | 84 | 76 |
| 14 days | 84 | 76 |

¹ Slightly Amine.

Poly-primary amines are used in the practice of this invention which contain at least two primary amine groups separated by alkylene groups having of up to about 6 carbons, alkylene-secondary amine-alkylene groups having up to six carbon atoms in each alkylene linkage, and benzyl and alkylenebenzyl groups having up to about six carbon atoms in the alkylene portion. The preferred polyprimary amines for instant use are those having two primary amine groups that may be separated by alkylene or alkylene-secondary amine-alkylene groups as in the formula $$H_2N-(R_c-NH)_d-R_c-NH_2$$

wherein $R_c$ is an alkylene group having up to six carbon atoms and $d$ is an integer that is one of 0, 1, 2, 3, 4 and 5. The most preferred useful poly-primary amines are those depicted by the foregoing formula wherein $R_c$ is an ethylene linkage and $d$ is one of 1 and 2. The presence of the secondary amine groups in the preferred amines aids in yet further accelerating the reaction of the polysulfide polymers formed therewith with polyepoxides.

I claim:

1. A solid resinous reaction product of a polyepoxide and an amino-functional polysulfide polymer, said polyepoxide having an epoxide functionality of at least approximately 2 and said polysulfide polymer having a structure corresponding to the formula

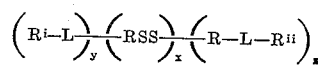

wherein $R^i$ and $R^{ii}$ are

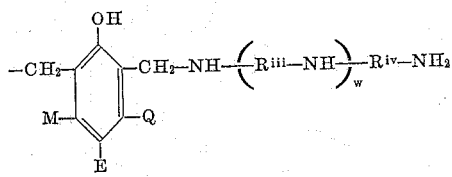

and wherein M, E, and Q are radicals selected from the group of radicals consisting of hydrogen, lower alkyl, lower alkylether, and lower alkylthioether groups, $w$ is an integer that is one of 0, 1, 2, 3, 4, 5, and 6, $y$ and $z$ are one of the integers 1, 2, 3, and 4, $R^{iii}$ and $R^{iv}$ are organic radicals selected from the group consisting of normal alkyl, branched alkyl, alkylether, alkylthioether, aromatic, and alicyclic radicals, R is an intervening polyvalent organic radical, $x$ is a positive number greater than 1, and —L— is a chalcogen radical selected from the chalcogen radicals consisting of —S— and —O—.

2. A solid resinous reaction product of a polyepoxide and an amino-functional phenol containing polysulfide polymer as recited in claim 1 wherein said chalcogen radical is —S—.

3. A solid resinous reaction product as recited in claim 1 wherein said amino-functional phenol containing polysulfide polymer is a liquid.

4. An amino-functional phenol containing polysulfide polymer with a structure corresponding to the formula

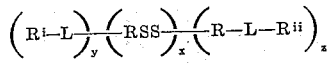

wherein $R^i$ and $R^{ii}$ are

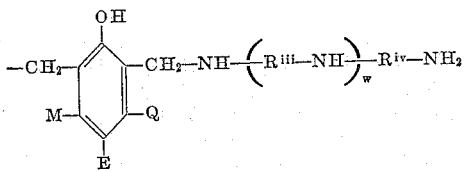

and wherein M, E, and Q are radicals selected from the group of radicals consisting of hydrogen, lower alkyl, lower alkylether, and lower alkylthioether groups, $w$ is an integer that is one of 0, 1, 2, 3, 4, 5 and 6, $y$ and $z$ are one of the integers 1, 2, 3, and 4, $R^{iii}$ and $R^{iv}$ are organic radicals selected from the group consisting of normal alkyl, branched alkyl, alkylether, alkylthioether, aromatic, and alicyclic radicals, R is an intervening polyvalent organic radical, $x$ is a positive number greater than 1, and —L— is a chalcogen radical selected from the chalcogen radicals consisting of —S— and —O—.

5. A polysulfide polymer as recited in claim 4 wherein said chalcogen radical is —S—.

6. A polysulfide polymer as recited in claim 4 wherein said $R^i$ and $R^{ii}$ are

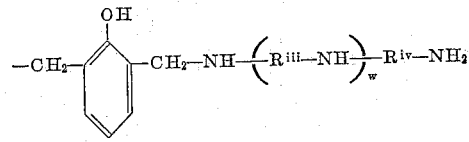

7. A polysulfide polymer as recited in claim 6 wherein said $R^{iii}$ and $R^{iv}$ are ethylene radicals and $w$ is 2.

8. A polysulfide polymer as recited in claim 7 wherein said R is the radical —$C_2H_4OCH_2OC_2H_4$—, and $x$ is a number from 2 to 10.

9. A polysulfide polymer as recited in claim 4 which has a molecular weight of about 1,200 to 1,300.

10. A process for providing an amino-functional phenol containing polysulfide polymer comprising the steps of (A) Admixing
  (i) a polysulfide polymer of the formula

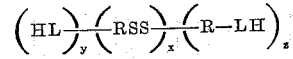

wherein HL— is a chalcogen hydric radical selected from the group of chalcogen hydric radicals consisting of hydroxyl and mercaptan, R is an intervening polyvalent organic radical, $x$ is a number greater than one, and $y$ and $z$ are each numbers that are one of 1, 2, 3, and 4, with
  (ii) about one mole of phenol per equivalent weight of said polymer in terms of chalcogen-hydric functionality, also, with
  (iii) about two mols of formaldehyde per equivalent of said polymer, and with
  (iv) at least about one equivalent weight of a poly-primary amine, as measured in terms of primary amine functionality, per one half equivalent weight of said polymer in terms of chalcogen-hydric functionality;

(B) Heating the admixture formed in step A above at a temperature of about 100° C. for a period of about 2 hours.

No references cited.

MURRAY TILLMAN, *Primary Examiner.*

P. LIEBERMAN, *Assistant Examiner.*

UNITED STATES PATENT OFFICE
CERTIFICATE OF CORRECTION

Patent No. 3,335,201            August 8, 1967

Eugene R. Bertozzi

It is hereby certified that error appears in the above numbered patent requiring correction and that the said Letters Patent should read as corrected below.

Column 1, line 69, for "reactions" read -- reactants --; column 2, line 64, for "provided" read -- provided by --; column 6, about line 32, for the left-hand portion of the formula reading $$a[HN \quad\quad read \quad\quad a[NH_2$$

Column 7, line 2 for "whereas" read -- wherein --.

Signed and sealed this 8th day of October 1968.

(SEAL)
Attest:

Edward M. Fletcher, Jr.         EDWARD J. BRENNER
Attesting Officer            Commissioner of Patents